Jan. 27, 1953   R. E. MOORE ET AL   2,626,669
PROPELLER CONTROL
Filed July 8, 1948   6 Sheets-Sheet 1

INVENTORS
Richard E. Moore.
James F. Mack.
BY Spencer, Hardman & Fehr
THEIR ATTORNEYS Patented Jan. 27, 1953

2,626,669

UNITED STATES PATENT OFFICE 2,626,669

PROPELLER CONTROL

Richard E. Moore, Dayton, Ohio, and James F. Mack, El Monte, Calif., assignors to General Motors Corporation, Detroit, Mich., a corporation of Delaware Application July 8, 1948, Serial No. 37,624

18 Claims. (Cl. 170—160.21)

This invention relates to the control of propeller operation on aircraft or the like, and has for an object to provide specific control of blade pitch for effecting propeller operation over selected portions of a wide range of pitch settings, that the propeller operation may always be within the prescribed limits selected by a pilot.

Another object of this invention is to provide a fluid pressure system of control for a variable pitch propeller that will closely, quickly and faithfully produce any blade adjustment called for and maintain such adjustment until a subsequent adjustment is made and then as efficiently maintain that adjustment.

Another object of the invention is to provide a fluid pressure system of high potential for application to motivating servos, when automatically applied by control elements handling a relatively reduced pressure potential tapped off from the high potential source.

Another object of the invention is to provide a fluid pressure system for control of blade pitch wherein a high potential pressure source is controlled by a relatively reduced potential pressure.

Another object of the invention is to provide a system of propeller control including a servo actuated distributor valve and a speed sensitive control valve operating to distribute relatively high pressure to blade motivating elements.

Another object of the invention is to provide a propeller control system by which the blades may be governed to constant speed in the positive range, moved to either the feathering range or negative range, or back to the governed range, at the will of an attendant.

Another object of the invention is to provide a fluid pressure system of control for propeller pitch that is powered by normal propeller operation to create its own fluid pressure source for control by self-contained mechanism to effect the particular operation and adjustment suited to a predetermined schedule.

Further objects and advantages of the present invention will be apparent from the following description, reference being had to the accompanying drawings, wherein a preferred embodiment of the present invention is clearly shown.

Figure 1:
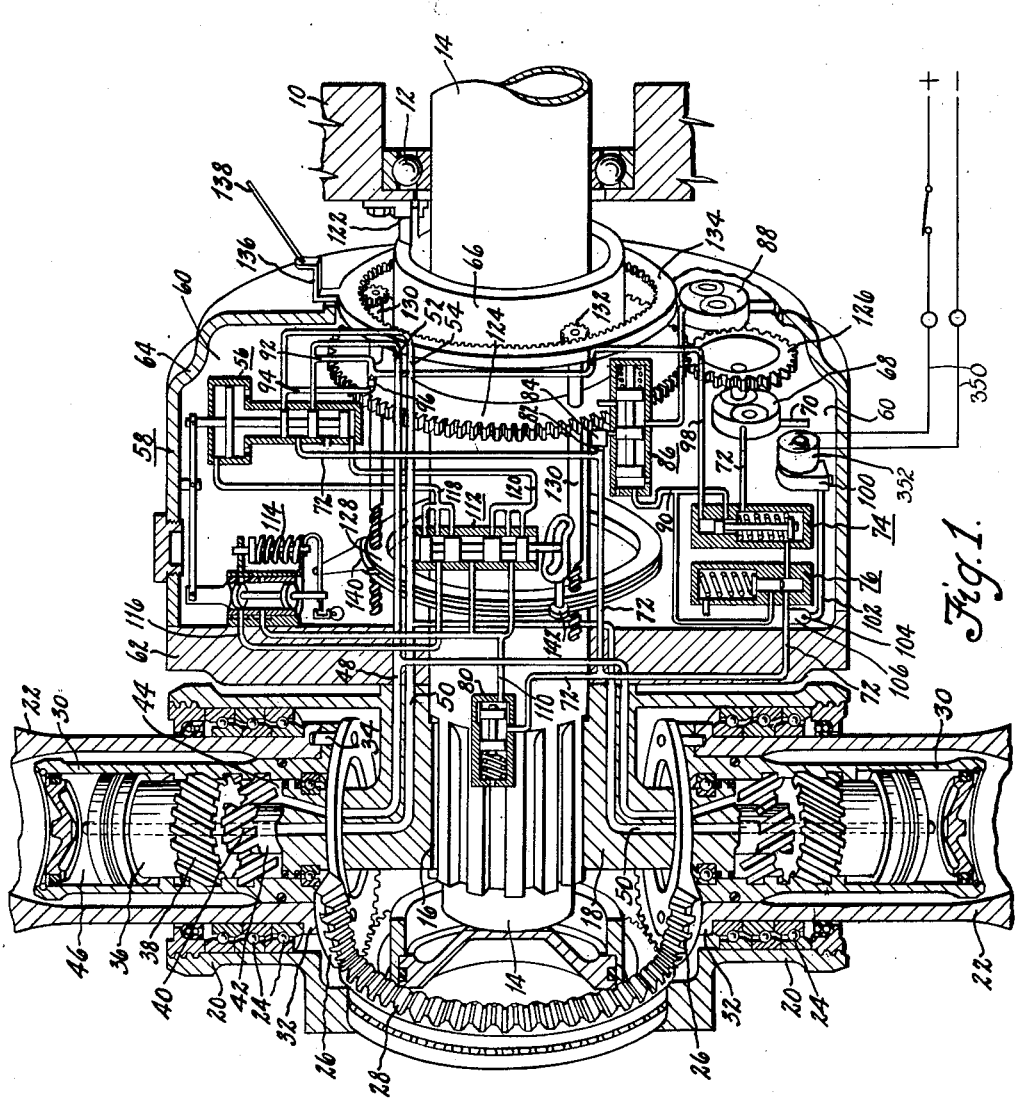
Fig. 1 is a schematic view of a propeller mechanism in section, illustrating diagrammatically fluid pressure apparatus and their connections for accomplishing the recited objects.

Referring first to Fig. 1 of the drawings, 10 refers to a gear casing or other supporting structure providing a bearing 12 in which there is rotatable a propeller shaft 14 to which is fixed in driven relation at 16 a hub 18 providing a plurality of sockets 20. In each of the sockets there is a propeller blade 22 journalled for rotation on its pitch changing axis by stack bearings 24, and providing a blade gear 26 each engaging a master gear 28 rotatable within or with respect to the hub 18. A blade cylinder 30 is contained within each blade 22 and has a flange 32 pinned to the blade and gear at 34 so that rotary movement of the cylinder will effect rotation of the blade, which rotation is effected by a double acting piston 36 having a helical splined relation at 38 with the inside of the cylinder, and at 40 with a spindle 42 extending from the hub 18. The piston 36 therefore divides the cylinder 30 into two pressure chambers 44 and 46 which are connected by passage 48 and 50 respectively with control passages 52 and 54 leading to a distributor valve 56 constituting part of the control apparatus located inside of a hydraulic regulator 58 carried by the propeller; the regulator providing a reservoir 60 enclosing the apparatus and containing a quantity of oil or other fluid medium.

The regulator 58 in main consists of a plate 62 mounted on the hub 18 and a cover 64 fixed thereto that completes the reservoir except for the centrally extending shaft 14 and adapter sleeve 66 later to be described. The regulator plate 62 provides for mounting of the elements of the control apparatus, including a system pump 68 intaking at 70 from the reservoir 60 and delivering into a passage 72 leading to a pressure control valve 74 thence to a relief valve 76 and a pressure reducing valve 80. Another branch 82 connects with a check valve 84 and thence to a pump control valve 86 associated with an auxiliary pump 88 that has a cross connection 90 back to the pressure control valve 74. An extension of 72 leads to the distributor valve 56 already mentioned, and from this the control passages 52, 54 lead to the blade shifting cylinder and piston, with taps 92 and 94 therefrom leading to a shuttle valve 96 that has a common connection 98 back to the pressure control valve 74, as will presently appear. An electric driven pump 100 with an outlet 102 to a relief valve and check valve 104 and 106 respectively which empties into the line 72, hydraulically after the relief valve 76, completes the high pressure lines of the system.

From the pressure reducing valve 80 a low pressure line 110 extends to a selector valve 112 and to a speed responsive valve 114 that controls a passage 116 also leading to the selector valve 112 that in turn controls passages 118 and 120 connecting with opposite ends of the distributor valve 56. The pumps 68 and 88 are driven in response to rotation of the propeller since the adapter sleeve 66 surrounding the shaft 14 and anchored at 122 against rotation, extends into the reservoir to provide a toothed flange 124 about which roll pinions 126 effective to drive the pumps. Thus, operation of the propeller causes the pumps to rotate and create a source of fluid pressure in the lines 72 and 82 feeding the pressure reducing valve 80, the pump control valve 86 and the distributor valve 56, the potential of pressure in the line 72, 82 being regulated by the valve elements 74 and 76. The actual control of pitch change is effected by the speed responsive valve 114 that only handles reduced pressure which it applies to the distributor valve 56 through the selector valve, the distributor valve handling the high pressure which it applies to the blade shifting motors as directed by the operation of the speed responsive valve 114.

The operation of the speed responsive valve 114 and the selector valve 112 are under the control of the pilot or other outside agency through the means of a control ring 128 slidable axially of the shaft 14 within the reservoir 60 through the action of threaded shafts 130 journalled in the flange 124 of the adapted sleeve and extending outside of the cover 64 to the end in pinions 132 engaging a ring gear 134 manually rotatable by a lever 136 and rod 138. Sliding in a groove of the control ring 128 there are two shoes 140 and 142 that actuate adjustable elements of the speed responsive valve 114 and the selector valve 112. Movement of the shoe 140 will change the setting at which the valve 114 will control, and movement of the shoe 142 will set the selector valve 112 for the operation desired.

Figure 2:
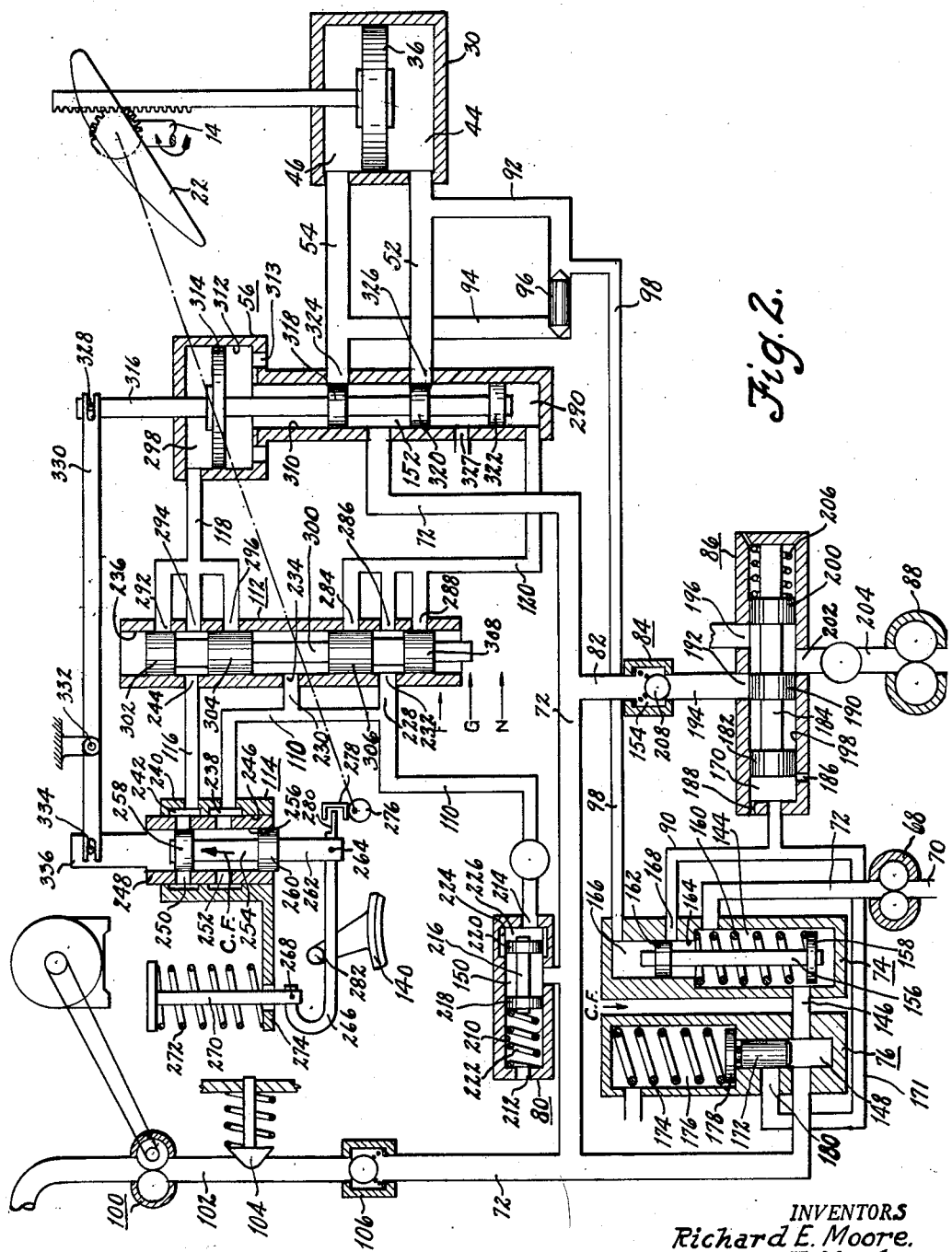
Fig. 2 is a fluid circuit diagram illustrating the apparatus in relation to governed positive pitch.

More specific relations of the control elements and their interrelated operation in effecting control will be understood by reference to the following description with respect to Figs. 2 to 6 inclusive. Referring to Fig. 2, the system pump 68 and its high pressure line 72 extends through a chamber 144 of the variable pressure control valve 74 and from there by a passage 146 to and through a chamber 148 of the pressure relief valve 76 and on to a chamber 150 of the pressure reducing valve 80 and to a chamber 152 of the distributor valve 56, with a branch 82 leading to a chamber 154 of the check valve 84. The valve unit 74 is an equal area valve that has a plunger 156 with a damping head 158 engaged by a spring 160 for lineal movement along the chamber 144 and fitted with a piston 162 slidable in a reduced bore 164 joining the chamber 144, the piston providing a chamber 166 at the end of the bore always open to the passage 98 from the shuttle valve 96. A port 168 opening to the bore 164 so as to be in valving relation to the piston 162 opens into the passage 90 leading to a chamber 170 of the pump control valve 86 as will directly appear. In the pressure relief valve 76 a piston 172 closes one end of the chamber 148 under the urge of a spring 174 lodged in a pocket 176 and engaging a flanged head 178 so that the piston normally closes an escape opening 180 leading back to the passage 90 by pipe 171. The valve elements 74 and 76 are supported on the regulator plate 62 in such manner that the plunger 156 and piston 172 are capable of moving radially with respect to the axis of rotation thereby responding to the combined effects of centrifugal force which is in aiding relation to the force of springs 160 and 174, or as shown in Figs. 2 to 6, toward the bottom of the sheet, as indicated by the arrow C. F.

The fluid under pressure from the system pump 68 will therefore be applied against the under side of pistons 162 and 172 in opposition to the centrifugal force and spring pressure, and as the fluid pressure increases in chambers 144 and 148 to dominate the combined opposing forces, the plunger 156 and piston 172 will be moved radially inward. At rest, the pistons 162 and 172 close off the ports 168 and 180 respectively, stopping any escape of fluid therethrough, but as propeller rotation begins and pressure develops in the outlet of the pump 68, the piston 162 moves inward to partially open the port 168 thereby relieving the pressure in chamber 144 with an escape of fluid through port 168 and passage 90 to the pressure chamber 170 of the pump control valve 86. If piston 172 moves to open port 180, which may occur on higher pressure, the exhaust therefrom is connected through 171 to the passage 90 and thence to chamber 170. That flow of fluid applies pressure against the face of piston 182 of plunger 184 and moves it to the right as shown in Fig. 2, to open an exhaust port 186 for relief of the pressure and return of fluid to the reservoir 60 from the blow-off ports 168 and 180. There is a restricted outlet 188 that is always open from the pressure chamber 170 to the reservoir.

Under normal governing conditions the system pump 68 will provide enough flow to more than satisfy the demands of the control apparatus and there will be a continuous flow from the openings 186 and 188, and the pressure in chamber 170 will hold the plunger 184 in such extended position that a valving land 190 covers a port 192 leading by pipe 194 to the check valve 84, and so that an exhaust port 196 opens from the bore 198 to the reservoir 60. The plunger 184 has a guide land 200 spaced from the valving land 190 which space in this position communicates with the exhaust port 196 and is always open to a port 202 from the delivery passage 204 of the auxiliary pump 88. During the said normal operation of the apparatus, in which the system pump 68 supplies all of the flow that is needed, the auxiliary pump 88 will be operating but its output will flow from port 202 directly through port 196 to the reservoir 60. Should the demands of the system amount to such that the output from pump 68 is insufficient, then the pressure in chamber 144 will be reduced to such an extent that there will be no flow from port 168 or from 180, and there will result a left hand movement of the valve plunger 184 under the influence of spring 206 which closes the exhaust port 196 and opens the port 192 to the port 202 from the auxiliary pump 88. The output of the auxiliary pump will then flow through the port 192, the pipe 194 to displace the ball 208 of the check valve 84 and thence by passage 82 to the high pressure line 72. If the pressure in the line 72 rises to an undesirable high value and beyond what can be controlled by the pressure control valve 74, then the full force is experienced by the chamber 148 of the relief valve 76, under which condition the piston 172 compresses the spring 174 until the port 180 is opened to discharge through 171 and 90 to chamber 170 and thence through 186 and 188 enough to reduce the pressure of line 72 to a desired value. Whatever pressure is experienced in the line 72 will be applied to the chamber 152 of the distributor valve 56 and to the blade shifting cylinder 30, as will presently appear.

The control system for actuating the distributor valve 56 operates on a relatively low pressure of fluid medium, that is taken off from the high pressure line 72 by the pressure reducing valve 80 which has a chamber 150 always open to the system high pressure. The chamber 150 is part of a bore 210 open at 212 to the reservoir 60 and at 214 to the line 110 feeding the selector valve 112 and the speed responsive valve 114. Within the bore 210 there is a spool valve 216 having spaced lands 218 and 220 disposed on either side of the chamber 150 with a spring 222 forcing the spool valve toward the right as shown to expose surface grooves or channels 224 by-passing the length of the land 220, the spring tending to reduce the capacity of a chamber 226 to which the port 214 opens. The combined area of the grooves 224 being greater than the area of the port 214, the pressure in chamber 150 flowing through grooves 224 into chamber 226 tends to move the spool valve toward the left as shown such that land 220 partially closes the ends of the grooves cutting down the flow from 72 into 110 with a consequent reduction in pressure. While relative high pressure 400 to 3000 p. s. i. can be maintained in the line 72, the valve unit 80 may reduce the pressure delivered to the line 110 to about 200 p. s. i.

The line 110 delivers reduced pressure by branches 228 and 230 to ports 232 and 234 opening to a bore 236 of the selector valve 112, and also to an annular channel 238 of a fixed cylinder 240 forming part of the speed responsive valve 114. A second annular channel 242 of the cylinder 240 opens into passage 116 that leads to a port 244 opening into the bore 236 of the selector valve. Movable along a bore 246 of the cylinder 240 that has the channels 238 and 242, there is a slidable porting sleeve 248 having sets of ports 250 and 252 spaced so as to center with the spacing of the channels 238 and 242, while a valve plunger 254 is slidable along the bore 256 of the porting sleeve. The plunger has a pair of spaced lands 258 and 260, and an extension 262 pivoted at 264 to a lever 266 secured at 268 to a rod 270 supported by a spring 272 seated on an extension 274 from the fixed cylinder 240. A blade operated cam 276 bears against a lever stop 278 that engages in spaced relation over the end 280 of the lever 266 and thus limits the lineal movement of the valve plunger 254 along the bore 256 of the shiftable porting sleeve 248, as will presently appear. A movable fulcrum 282 engaged at the upper side of the lever 266 is supported by the shoe 140 that has been described as coupled with the control ring 128 and under control of the pilot for selecting the speed at which the apparatus will control.

The bore 236 of the selector valve 112, has two sets or groups of ports lineally spaced to generally center with ports 232 and 244. One group indicated at 284, 286 and 288 are associated with port 232 from the reduced pressure line 110 and all open into the passage 120 leading to a pressure chamber 290 at the lower end of the distributor valve 56. The second group of ports indicated at 292, 294, and 296 are associated with the port 244 from the lead 116 connecting with the port 242 of the speed responsive valve 114, and all open to the passage 118 leading to the large pressure chamber 298 at the upper end of the distributor valve 56. Within the bore 236 of the selector valve 112 there is a plunger 300 having spaced lands 302, 304, 306 and 308, the plunger being selectively movable to either one of three positions as indicated by the arrows marked F. G. N., for feathering operation, for governed operation and for negative pitch operation respectively. Movement of the plunger 300 controls the flow of fluid under pressure from the ports 232, 234, and 244 into the ports 284, 286, 288, 292, 294 and 296 and therefore the operation of the distributor valve 56.

The distributor valve 56 is of the servo type and is subject to differentials of pressure. The chamber 152 is part of a bore 310 opening at its upper end into a larger diameter 312 housing a piston 314 as a movable wall of the chamber 298. Connected with the piston 314 there is a rod 316 having three spaced lands 318, 320 and 322 slidable within the bore 310, the land 322 forming a movable wall for the chamber 290. The lands 318 and 320 are so spaced on either side of the chamber 152 as to be generally centered with respect to pitch control ports 324 and 326 opening into the pitch control passages 50 and 48 respectively. An extension of the rod 316 is pinned at 328 to one end of an arm or cam 330 pivoted to rigid structure at 332 and linked at 334 to an extension 336 of the porting sleeve 248 of the speed responsive valve 114.

All of the control apparatus illustrated on Fig. 2 is contained within the reservoir provided by the regulator 58 as shown and described with respect to Fig. 1, and therefore is rotatable with the propeller, so that centrifugal force tends to move the valve element 254 radially outward as indicated by the associated arrow C. F. That tendency is opposed by the spring 272 attached to the rod 270 and lever 266, so that a point is reached at which the centrifugal force and spring tension acting on the valve is balanced, with the land 258 covering the ports 250. The apparatus will then be operating onspeed, and the several parts of the apparatus will occupy the positions illustrated in Fig. 2, if the selector valve 112 is set at G for governed pitch operation. High pressure will obtain in the line 72, the chamber 150 of the pressure reducing valve, and in the chamber 152 of the distributor valve, but no pitch change will occur because the control ports 324 and 326 are both equally closed. The reduced pressure in line 110 penetrates to the bore 236 of the selector valve, and to the bore 256 of the speed sensitive valve. The reduced pressure at port 232 of the selector valve is applied to port 286 leading by 120 to the small servo-chamber 290 of the servo distributor valve 56, but there can be no upward movement of the valve rod 316 because the large servo-chamber 298 connecting through 118, 294, 244, 116 and 242 to ports 250 is blocked by valve land 258. Hence the propeller operates at governed speed, with the system pump 68 supplying the needed pressure with a surplus of fluid under pressure escaping through the port 168 and flowing to the chamber 170 to move the valve rod 184 in disconnecting relation for the auxiliary pump 88.

Figure 3:
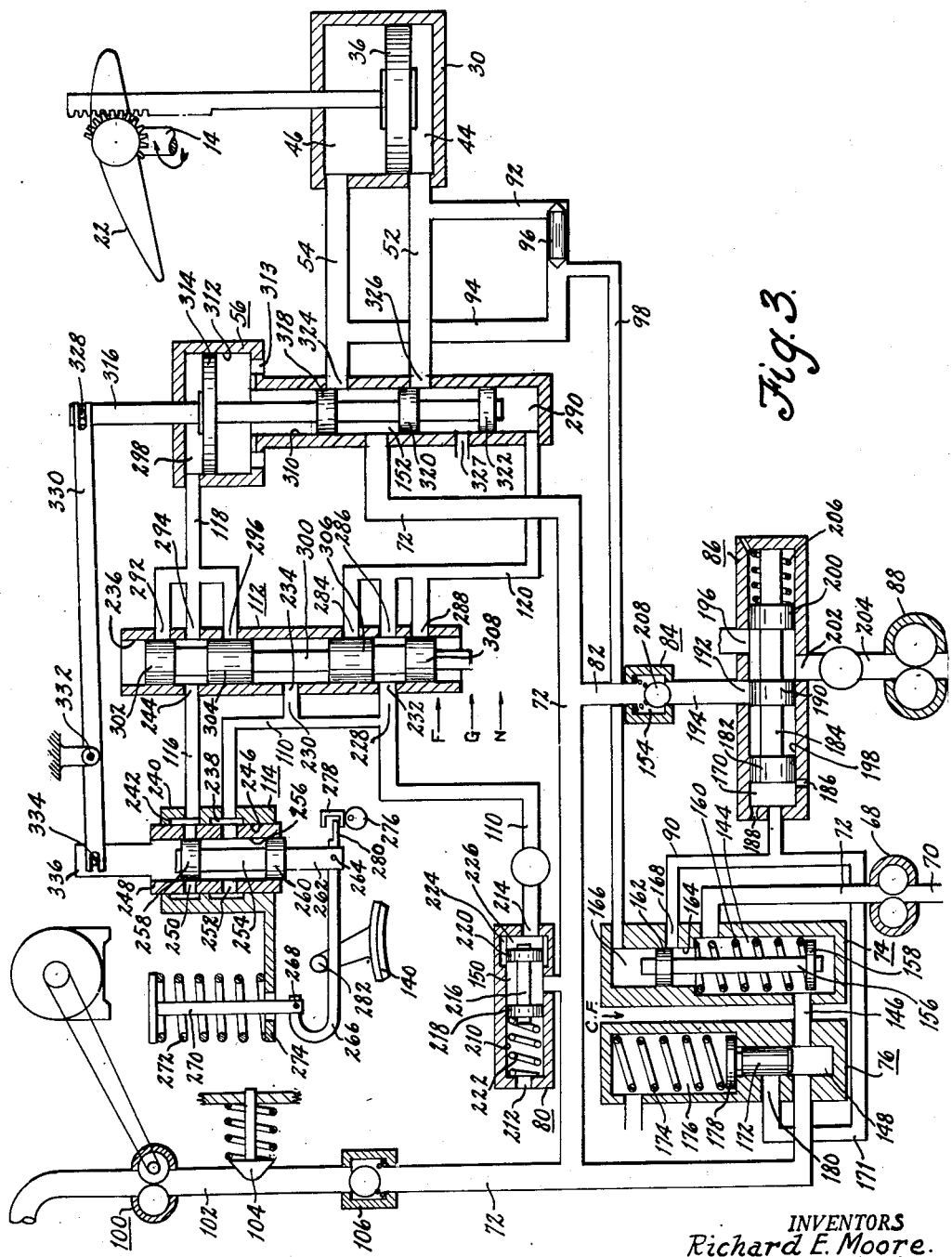
Fig. 3 is a fluid circuit diagram illustrating the apparatus in underspeed conditions.
Figure 4:
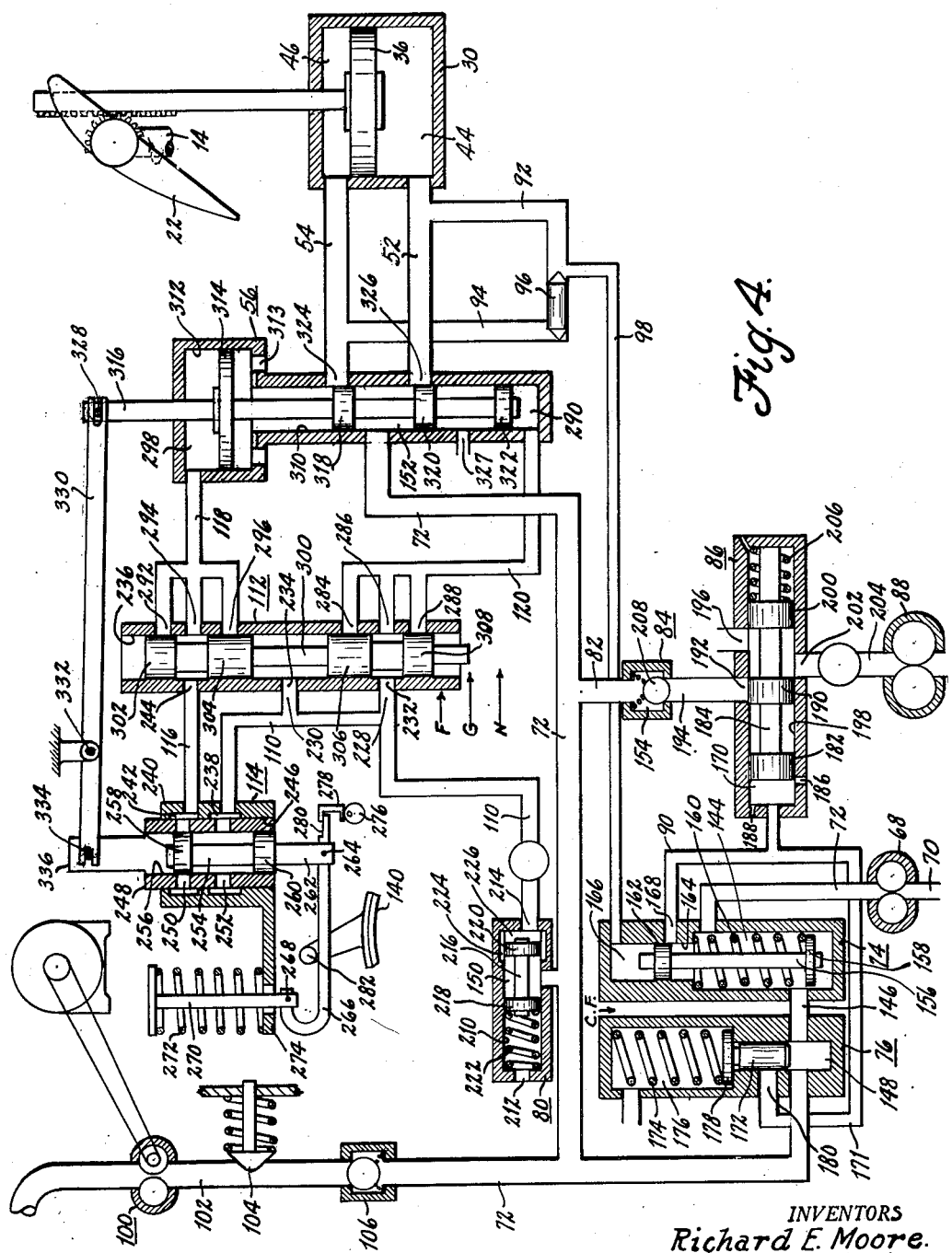
Fig. 4 is a fluid circuit diagram illustrating the apparatus in overspeed conditions.

While the selector valve 112 is in the governed pitch position at G, if there should be a change in propeller operation to cause an underspeed, then the apparatus would take up the relation depicted in Fig. 3, where the lessened centrifugal force permits the valve plunger 254 of the speed responsive valve 114 to move radially inward or downward as respects that view. The port 250 is first opened to drain so that the large servo-chamber 298 of the distributor valve may at least be partially exhausted through 118, 294 244, 116 and 242 to the reservoir, the fluid therein being forced out by the reduced pressure from line 110 moving through 232, 286, and 120 to the small servo-chamber 290, there pressing against the under side of piston 322 to raise the valve rod 316. Aside from forcing the fluid out of chamber 298 to drain the valve lands 318 and 320 now span the port 324 so as to connect it with the high pressure coming in from the line 72, and the plunger 316 also rocks the lever 330 for depressing the sleeve 248 toward catching up with the valve plunger 254 to cut off the drain from the large servo-chamber 298 as is shown. The port 324 being open to high pressure, it now flows through 54 to chamber 46 of the blade servo-motor and moves the piston to effect a reduction of pitch for the blade 22. The high pressure also flows through the passage 94 to the shuttle valve 96 and moves it to the right as shown to admit the high pressure to the common branch 98 leading back to the chamber 166 where it is applied at the end of the piston 162 and tends to close off the port 168 of the pressure control valve 74. That immediately increases the pressure in the line 72 to meet the demands of the flow through the control passage 54 to the blade servomotor for shifting the blade 22. If there is only a slight opening of the port 324 there will be only a slight pressure application through the passage 54 to the servo, and through the passages 94 and 98 to the chamber 166 of the pressure control valve, and hence only a slight closing of the port 168 with a slight increase of pressure in the line. On the other hand, if there is a greater opening of the port 324, there will be a correspondingly greater pressure application in 54, 94, 98 and 166 with a resultant greater closing of port 168 and an increase of pressure in the high pressure line 72. During that operation the chamber 44 of the blade servomotor is draining through passage 52 and ports 326 and 327 back to the reservoir 60. When the blade 22 acquires a pitch setting that permits the propeller to rotate at the selected speed, the land 258 and port 250 of the speed sensitive valve will again be in registry closing off fluid movement to or from the servo chamber 298 of the distributor valve which by that time has returned to the governed pitch condition shown in Fig. 2.

Figure 5:
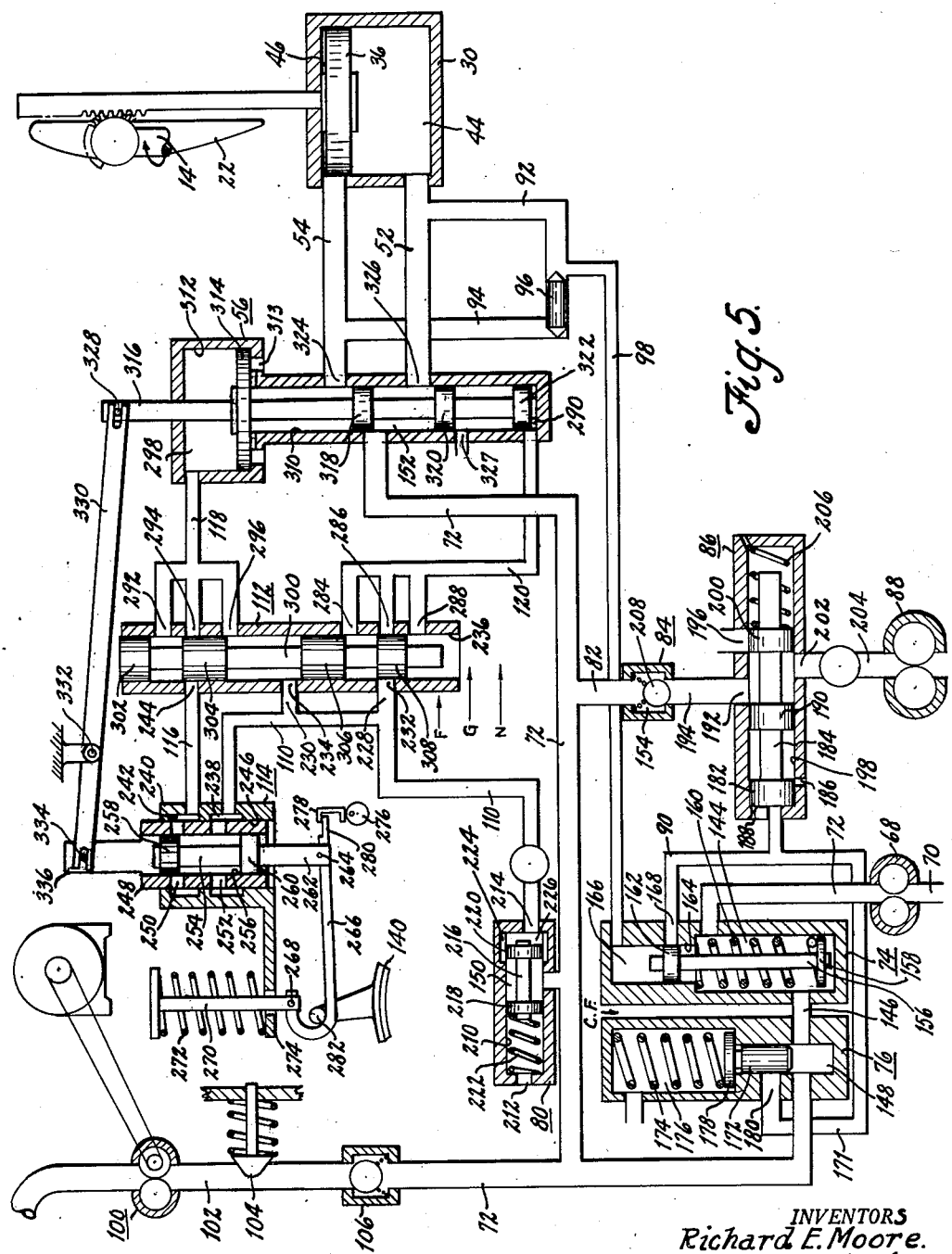
Fig. 5 is a fluid circuit diagram illustrating the apparatus in feathering pitch conditions.

On the occurrence of overspeed operation of the propeller, while the selector valve 112 is in the governed pitch position indicated at G in Fig. 2, the valve plunger 254 will move radially outward due to centrifugal force overcoming the force of spring 272 rocking the lever 266 over the fulcrum 282. That outward movement of the valve 254 causes land 258 to temporarily uncover or open port 250 and permit the reduced pressure from 110 to flow through port 252, the bore of sleeve 248, the port 250, the channel 242, passage 116, port 244, port 294 and passage 118 to the large servo-chamber 298 where the reduced pressure forces piston 314 downward to at least slightly open the control port 326 to the high pressure line 72. It should be observed that during this movement of the distributor valve the reduced pressure is also being applied to the lower side of piston 322, but due to the greater area of piston 314 than piston 322 that is acted upon by the same reduced pressure from passage 110, the resultant movement of the valve plunger 316 will follow the pressure application in chamber 298 to move the valve downward. As the valve moves downward the rod 316 will rock the lever 330 so as to shift the porting sleeve 248 toward catching up with the valve plunger 254 and tending to again close the port 250. Control passage 52 being open to the high pressure in line 72, it flows to or is applied to the chamber 44 of the blade servo-motor, and through the passage 92 to the shuttle valve 96 which now shifts to the left as shown opening the passage 92 to the common passage 98 leading to the pressure chamber 166 of the pressure control valve 74. In consequence the blade 22 is shifted an appropriate amount to increase the load sufficient to bring the speed back to the selected value. The speed decreasing, the valve element 254 returns to the equilibrium position where the land 258 covers the port 250 and the associated parts assume the governed pitch relation shown in Fig. 2. During the shift of the piston 36 because of high pressure application in chamber 44, relief of pressure or drain of chamber 46 is effected through 54, 324, 310, 312 and vents 313 back to the reservoir 60. During this shift to correct for overspeed, the needs for high or continued pressure is reflected through 92, 98 to the pressure control valve that matches the potential of pressure in the line 72 with the power requirements for moving the blades to a new pitch position. The pressure control valve 74 is therefore variable in its response and regulation of pressure in the line 72; increasing that potential a little for small power demands, and increasing it proportionately more for greater power demands. However, if the power demands are too great, such as incident to selecting a widely different speed level for propeller operation, the pump unit 68 may not be enough by itself to insure sufficient flow in line 72 to effect the blade shift satisfactory for the new conditions. At the instance of such power demands the pressure in chamber 144 will fall and the pressure in chamber 166 will rise effecting complete closing of port 168 leading to the pressure chamber 170 of the pump control valve 86. Pressure being cut off from chamber 170, the spring 206 now shifts the plunger 184 to the left as shown in Fig. 5, connecting pump port 202 with port 192 leading through check valve 84 to the line 72. Under those conditions the line 72 is supplied with fluid under pressure from both pumps 68 and 88 so long as the propeller is rotating. The pressure in the line 72 may rise sufficiently that its potential reflected back to the chamber 144 may again work upon the piston 162 to open the port 168 and effect disconnection of the pump 88, as has been explained. The pressure in line 72 can never reach undesirable values because of the relief valve 76. Any pressure that exists in the line 72 is also present in chamber 148 and exerts itself against the end of piston 172 to blow off through 180 at such value determined by the spring 174. From 180 flow through 171 and 90 reaches chamber 170 to exit at 186 and 188.

Change of propeller operation from goverened pitch to either feathering or negative pitch, or return shift from either of these conditions to governed pitch operation, is such change that may require the operation of both pumps 68, 88 and may be assisted by the coincident or supplemental operation of the feathering pump 100, that can be best described with respect to Fig. 5 of the drawings. In selecting a feathered condition of the blades, the pilot actuates the ring gear 134 (Fig. 1) to call for a maximum pitch setting of the blades which actuation moves the fulcrum 282 along the lever 266 and shifts the selector valve element 300 so that it indexes at F in the drawing of Fig. 5. The balance of centrifugal and spring forces acting upon the valve element 254 are completely upset and the plunger 254 moves radially outward to open widely the port 250 into the line 116. However, the port 244 is now closed by the land 304 of the selector valve which land also closes the port 294 leading to the large servo-chamber. Thus the shifted position of the speed sensitive valve element 254 has no motivating effect upon the servo-distributor valve. The shifted position of the selector valve element 300, however, connects the reduced pressure line 110 to the large servo-chamber 298 through the ports 234, 296 and line 118, while it also closes ports 232, and 286, with an opening to drain for the chamber 290 through 120 and 288 leading back to the reservoir 60. The servo-chamber 298 being open to unthrottled reduced pressure from line 110, while the small servo-chamber 290 is opened to drain, the valve rod 316 will travel the full distance downward and rock the lever 330 in a clockwise direction, which will move the porting sleeve 248 in such direction tending to catch up with the movement of valve element 254. The depressed position of the valve rod 316 so disposes the lands 318 and 320 that they now span the port 326 connecting the pressure line 72 directly to the servomotor chamber 44 through port 326 and control passage 52, with the branch 92 and 98 applying the pressure to the chamber 166 for closing off the port 168 of the pressure control valve 74. The pressure application in chamber 44 of the blade actuating servo-motor actuates the piston to turn the blade 22 into the edge-on position as shown in Fig. 5, where it offers the greatest resistance to propeller rotation.

The feathered condition of the propeller may be called for under two different conditions, first while the propeller is rotating, as during flight, and second, while the propeller is not rotating, or while the craft is on the ground at rest. The relations of the control elements are practically the same for both conditions, but there is some variation in the power sources for effecting the complete feathering of the propeller. Feathering while the propeller is rotating relies for the first part of the cycle on the pressure developed by the rotating propeller through the drive of its pumps 68 and 88. The speed of propeller rotation rapidly decreases as the blades are shifted toward a flat pitch, and is accompanied by a rapid decrease in the output of the pumps 68 and 88. The output of the pumps may be insufficient to effect the fully feathered position from propeller rotation alone. On the other hand the time taken by the apparatus for shifting to the feathered position may be too long to satisfy the wishes of the pilot. In any event, the pilot may hasten the feathered shift, or he may effect it wholly by operation of the feathering pump 100. That is accomplished by closing a suitable switch in the electric leads 350 connecting the electric motor 352 with a suitable current source in the craft. The motor 352 is mounted in the regulator 58 and drives the high capacity pump 100 which draws fluid from the reservoir 60 and delivers it under pressure to the line 102 to depress the check valve 106 and flow into the line 72. When the feathered condition is reached the pressure will build up in the line 72 and may be relieved at ports 104, 168 and 180 to return to the reservoir 60. Thus no damage is done to the system even if the pump 100 continues to operate after the feathering position is reached.

In the event of feathering while the propeller is at rest on the ground, or not rotating, there is then no propeller rotation to depend upon for driving the pumps 68 and 88, and all of the power for making the shift to the feathered position must be derived from the feathering pump 100. The selector valve 112 will be set in the same position indicated at F, and as soon as the output of pump 100 reaches the line 72 it will be applied to the pressure reducing valve 80 where a lesser potential is delivered through line 110 and as heretofore described actuate the servo-distributor valve 56 to connect the high pressure line 72 with the chamber 44 for shifting the blades to the feathered position.

When it is desired to unfeather, or return the blades from the feathered position to the governed range, the selector valve 300 is returned to the governed position indicated at G, and coincidentally the fulcrum 282 is moved from beneath the spring 272 to a position along the middle of lever 260, which conditions the control apparatus substantially as indicated in Fig. 2. The blades being adjusted to the feathered position, there is no rotation of the propeller and consequently no driving force applied to the pumps 68 and 88. The lines 72 and 110 will be without any substantial pressure, and centrifugal force being absent the valve element 254 of the speed responsive valve 114 will occupy a radially inward position normally opening port 250 to drain for servo-chamber 298. The valve rod 316 of the distributor valve 56 will at first occupy the position for feathering shift but the chamber 298 is opened to drain, while the chamber 290 is opened by passage 120 and port 286 which in the G position of the member 300 is connected with the low pressure line 110. The valves 74 and 76 will both be closed under the urge of their springs 160 and 174 respectively. Also the auxiliary pump 88 will be connected to deliver into the line 72. Under those conditions, operation of the electrically driven feathering pump 100 will supply fluid under pressure to the line 72 from which it is reduced by valve 80 to flow through 110, 232, 286, and 120 to the chamber 290 effecting first a closing of control port 326 and thence opening of control port 324 with a follow-up movement of the valve sleeve 248. As the pressure from line 72 applied through the port 324 flows into the chamber 46 of the blade shifting servo-motor, the blades 22 will be turned back into the governed pitch range. If the craft is at rest on the ground with there being no rotation of the propeller, the desired shift can be attained solely by the feathering pump 100, the pilot arresting the shift at any point by opening the control switch for the motor 352. By shifting the selector valve to the position F the blades may again be feathered without again starting the engine, or rotating the propeller.

Unfeathering while the craft is in flight is assisted by the propeller mechanism itself, since a pitch shift of the blades enough to give them wind-milling rotation will cause the pumps 68 and 88 to rotate and deliver fluid under pressure to the system to assist the feathering pump. When the unfeathering has been accomplished the conditions set out in Fig. 2 will have been reestablished, and the propeller will then operate again on governed speed as determined by the setting of fulcrum 282 along the lever 266.

Figure 6:
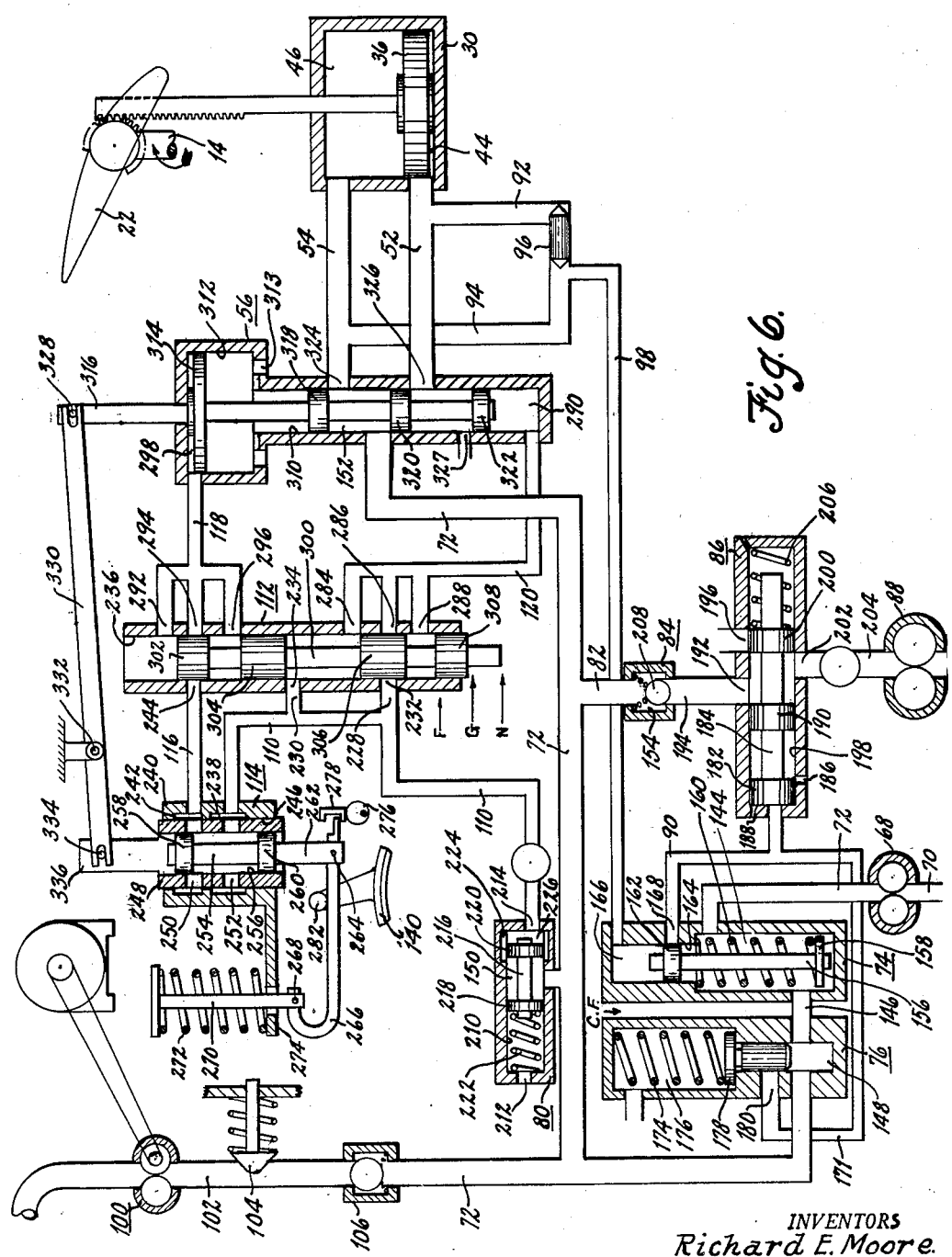
Fig. 6 is a fluid circuit diagram illustrating the apparatus in negative pitch conditions.

When negative pitch is desired for any reason, the selector valve is moved to the index N as shown on Fig. 6. Ports 244, 294 are interrupted by land 302 and ports 232, 286 are interrupted by land 306, while port 292 is opened to drain for servo-chamber 298 through 118 and port 284 is connected with port 234 for applying reduced pressure to servo-chamber 299 through 120. By this shift of the selector valve, the speed responsive valve is wholly cut out of the system so far as its control is concerned, and the larger servo-chamber of the distributor valve is connected directly with drain back to the reservoir 64. The reduced pressure from the line 110 is led directly to the smaller servo-chamber of the distributor valve and shifts the valve rod 316 upward so that port 324 is directly connected to high pressure from line 72 for flow into blade shifting servo-chamber 46 through control passage 54, the chamber 44 being connected to drain through 52, 326 and 327. In consequence thereof the blade 22 rotates in a pitch shifting sense through zero pitch to a setting in the negative range, substantially as shown in Fig. 6.

During the shift to negative pitch the blade movement causes rotation of the cam 276 which sets the yoke 278 to insure that the valve 254 will be in the proper position when the pitch is returned to the positive range. Rise of the rod 316 on the servo-valve will also rock the lever 330 in a counter-clockwise direction to depress the sleeve 248, though the position of the sleeve has no effect on the control during negative pitch operation, but it is part of the conditioning of the valve preparatory to return to governed positive pitch.

The shift from positive to negative pitch, and also the return shift from negative to positive is attended by a considerable volumetric flow of fluid that must be under considerable pressure to effect the change rapidly. The pumps 68 and 88 under the control of the valve units 74 and 86 will normally provide the pressure and flow that is needed, though they may be supplemented by the electric driven feathering pump 100 if desired. On the other hand, if the propeller is not rotating, either of the shifts may be effected by the feathering pump if the valve 112 is set in the proper position. In returning to governed positive pitch the selector valve is moved to a point where the reduced pressure from line 110 is admitted to the chamber 299 which forces the piston 314 and rod 316 downward to connect high pressure line 72 with the servo-chamber 44 for returning the blade 22 through zero pitch to the working range. If the propeller is rotating the speed of rotation will increase as the blades pass through zero pitch, and the valve plunger 254 and sleeve 248 will assume a cooperating position and relation to take over the governing function as soon as the speed of rotation satisfies the conditions called for by the setting of the pilot's control and the fulcrum 282. At the start of shift from negative to governed pitch the speed sensitive valve will be properly conditioned for connecting port 250 with chamber 298 as shown in Figs. 6 and 2. Downward movement of 316 tends to raise sleeve 248, but the attendant increase in propeller speed causes valve 254 to raise so that port 250 is maintained open until the governed pitch position is attained, as fully shown in Fig. 2.

From the foregoing it will be apparent that there has been provided a self-contained fluid pressure system for all of the functions of propeller blade pitch control and adjustment, in which the power is essentially derived from the propeller rotation to provide a high pressure line for application directly to fluid pressure servos for effecting blade pitch movement, and to provide a low pressure branch for distribution to and by the control valves for actuating the servo-distributor valve by which the high pressure is directed to the blade shifting servo. That provides a control system whereby any governing or control function operates on a low pressure fluid circuit in such manner that the high pressure is applied only to the motivating members actually producing a change in the blade shift. The high pressure line is always afforded with sufficient potential and flow to effect the blade pitch changes called for, whether it be governed pitch, feathering, negative shift, or return to governed pitch operation, by means of a variable pressure control valve that matches the potential and flow in the high pressure line to meet the demands made during ordinary changes in blade pitch, and effects the addition of greater potential and flow by cutting in an additional pump when greater demands are made on the system. For static operation of the blade shifting means, that is, while the propeller is not rotating, an electric driven pump is provided and connected into the high pressure line with selective means for operating it so that any of the blade shifting functions can be accomplished at any time, or which may be used at any time to assist the propeller driven agencies in accomplishing the selected blade pitch change. This electric driven pump is also part of the self contained fluid pressure system, since the pump has an intake from the reservoir to which all control apparatus discharges, and delivers fluid under pressure to the high pressure line for effecting the various functions, after which the fluid returns to the reservoir as in other cases.

While the embodiment of the present invention as herein disclosed, constitutes a preferred form, it is to be understood that other forms might be adopted.

What is claimed is as follows:

1. A fluid pressure system for the control and adjustment of blade pitch of rotatable aircraft propellers in the feathering, governed positive, and negative pitch range, comprising in combination, fluid pressure motors carried by the propeller for adjusting the blades in either direction, means within the propeller and operable upon rotation thereof providing a source of fluid under pressure, passage means connected with the source providing a high pressure line, a distributor valve having a pressure port connected with said high pressure line and control ports adapted to direct fluid under pressure to the fluid pressure motors, a pressure reducing valve and passages tapped into the high pressure line to provide a low pressure line, a speed sensitive valve assembly having a pressure port connected with the low pressure line, fluid servo pistons and chambers having interruptable connections with the low pressure line for moving the distributor valve in opposite directions, a selector valve having pressure ports open to the low pressure line and control ports connected with the said servo chambers for controlling the application of low pressure to, and for selecting the interruptible connections to the said servo chambers, and means for moving the selector valve for predetermining propeller operation in the feathering, governed positive, and negative pitch ranges.

2. The combination set forth in claim 1, wherein the speed sensitive valve comprises a centrifugally responsive plunger, a cooperating sleeve providing the pressure supply port and having a control port cooperating with the centrifugally responsive plunger, mechanical linkage connecting the valve sleeve with said distributor valve whereby shifting movement of the centrifugal plunger for applying a control impulse to the distributor valve is followed by the sleeve upon movement of the distributor valve in accomplishing the control setting.

3. The combination set forth in claim 1 wherein, the servo chambers include pistons and cylinders of different areas operable upon the distributor valve in opposing relation, passage means continuously connecting the smaller chamber to low pressure during governed pitch operation, and passage means including a part of the selector valve for subjecting the larger chamber to low pressure of the system when the speed responsive valve responds to an increase of propeller speed.

4. The combination set forth in claim 1 wherein, manual means moves the selector valve to accomplish propeller operation in feathering, governed positive, and negative position, means including said selector valve for by-passing any operational effect of the speed sensitive valve during propeller operation in the feathering position, and passage means including a part of the selector valve for applying low pressure of the system directly to a servo chamber for shifting the distributor valve in an increase pitch direction for applying high pressure of the system to effect feathering pitch position.

5. The combination set forth in claim 1 wherein, passage means including a part of the selector valve by-passes the speed sensitive valve when the selector valve is moved to the negative pitch position, and passage means including a part of the selector valve applies the low pressure of the system directly to a servo chamber for shifting the distributor valve in a decrease pitch direction to apply high pressure of the system for effecting negative pitch setting.

6. The combination set forth in claim 1 wherein, the propeller operated fluid pressure source includes a plurality of continuously operating pumps, and a variable pressure control valve has a piston area constantly exposed to the high pressure line, and has an opposing piston area occasionally connected with the control passages extending between the distributor valve and the fluid pressure motors, said pressure control valve having passages and means for connecting and disconnecting the output of one of the pumps to the high pressure line in response to power demands for effecting the selected adjustment of blade pitch.

7. A fluid pressure system for the control and adjustment of blade pitch of rotatable aircraft propellers in the feathering, governed positive, and negative pitch ranges, comprising in combination reversible fluid pressure motors for adjusting the blades in either direction, means carried by the rotatable propeller providing a source of fluid under pressure, passage means connecting with the fluid pressure source providing a relatively high pressure line, a distributor valve having a pressure supply port constantly open to the high pressure line, and having control ports connected with the reversible fluid pressure motors, a pressure reducing valve tapped into the high pressure line and providing a low pressure branch, blade pitch control means having a pressure port constantly open to the low pressure line and having a control port thru which it may distribute low pressure, a pair of opposed servo chambers for operating the distributor valve to apply high pressure for movement of the blades in one direction or the other, said control means including a speed sensitive valve cooperable with the pressure port and the control port thereof, and passage means connecting the control port of the said speed sensitive valve with one of said servo chambers for variably applying low pressure to said one of the servo chambers, and a manually operable selector valve having pressure ports open to the reduced pressure, and having control ports selectively connectible with the servo chambers and being selectively movable to a feathering, negative and governed pitch position for determining the effect that the low pressure applied by the speed sensitive valve will have upon the distributor valve.

8. In a system for control of variable pitch propellers having blades adjustable and controllable in governed speed, feathering, and negative pitch ranges, the combination comprising, means carried by the rotatable propeller providing a self-energized fluid pressure system whenever the propeller is rotated, and adapted to adjust the blade pitch in governed speed, and to move the blades to feathering and negative pitch ranges, reversible blade shifting motors for adjusting the blades upon application of fluid pressure thereto, said system including a high pressure line, a low pressure line, a plurality of propeller driven pumps having connection with said pressure lines, means connected with said low pressure line for controlling application of fluid pressure from said high pressure line to said blade shifting motors, passage means providing an electric motor driven pump selectively operable to discharge into the high pressure line for assisting the propeller driven pumps in effecting the desired adjustment of blade pitch in any pitch range, and means controlling the operation of the motor driven pump for effecting blade pitch adjustment when the propeller is not rotating.

9. In a system for control of variable pitch propellers having blades adjustable and controllable in governed speed, feathering, and negative pitch ranges, the combination comprising, means carried by the rotatable propeller providing a self energized fluid pressure system whenever the propeller is rotated, and adapted to adjust the blade pitch in governed speed, and to move the blades to feathering and negative pitch ranges, reversible blade shifting motors for adjusting the blades when fluid pressure is applied thereto, said system including a plurality of fluid pressure pumps driven by propeller rotation, passage means connected with the output of the pumps and providing a high pressure line, a servo actuated distributor valve having a pressure port open to the high pressure line and a pair of control ports for controlling the application of high pressure to either side of the reversible blade shifting motor, a servo chamber subject to low pressure and having a piston area of relatively small area for moving the distributor valve in one direction, an opposing servo chamber also subject to low pressure and having a piston area of relatively large area for moving the distributor valve in the opposite direction, means connected with the high pressure line and providing a branch of low pressure, a selector valve having pressure ports open to the low pressure branch and having lands and control ports for controlling the application of low pressure to both of said servo chambers, a control valve having a pressure port open to the low pressure branch and having a control port with interruptible connections to one of said servo chambers, said control valve including means responsive to change of speed of propeller rotation for varying the application of the low pressure to the servo chamber having the piston of large area, said control valve including means operating upon increase of propeller speed to apply low pressure to said servo chamber of large diameter, and on decrease of propeller speed to open the said large servo chamber to drain, said distributing valve operating in consequence thereof to apply high pressure to the blade shifting motor for increase of the blade pitch and for decrease of the blade pitch respectively.

10. The combination set forth in claim 9 wherein, passage means connects the servo chamber of small piston area directly with the low pressure branch during governed speed and during negative pitch range, and connects that chamber to drain during feathering operation, passage means including said selector valve connecting the servo chamber of large piston area with the control port of the control valve during governing speed, and passage means including a part of the selector valve for directly connecting the large piston area with the low pressure branch during feathering and also connecting the large piston area with drain during operation in the negative pitch range.

11. The combination set forth in claim 9 wherein, the control valve includes a landed piston responsive to centrifugal force, a shiftable sleeve providing the control port and cooperable with a land of said piston for control of low pressure flow to the servo chamber of large diameter, and mechanical means connecting the servo actuated distributor valve with said shiftable sleeve causing the sleeve to follow up the control movement of the landed piston.

12. In a self-energized fluid pressure system for controlling propeller blade pitch in governed speed, and for moving the blades to feathering and negative pitch range, the combination comprising, pump means driven upon rotation of the propeller providing a source of fluid pressure, passage means connected with the pump outlet providing a high pressure line, pressure reducing means providing a low pressure branch connected with the high pressure line, reversible blade shifting motors operable upon directed application of high pressure to adjust the propeller blades, a servo actuated distributor valve having a pressure port open to the high pressure line and having a pair of control ports for directing application of high pressure to either side of the blade shifting motor, a speed sensitive valve having a pressure port open to the low pressure branch and having a control port adapted to supply low pressure to and drain from the servo actuated distributor valve for controlling the operation of the distributor valve in applying high pressure to either side of the blade adjusting motor, a selector valve having one pressure port constantly open to the low pressure branch, a second and valve controlled pressure port open to the low pressure branch, and a cooperable set of control ports each adapted to be connected with said second port, pressure and passage means connecting the set of control ports with the servo actuated distributor valve for determining whether the blades will be operated in governing speed, feathering or in negative pitch range.

13. The combination set forth in claim 12, wherein, the pump means discharging into the high pressure line include a system pump and an auxiliary pump driven by propeller rotation, and an electric motor driven pump with means for controlling its operation, said auxiliary pump having its output connected to and disconnected from the high pressure line in response to the needs of flow and pressure in the high pressure line to satisfy the demands made by a selected shift of the blades within, and from one range to another, a pump control valve for controlling the connection and disconnection of the auxiliary pump to the high pressure line, a variable pressure control valve constantly exposed to the high pressure line and having an exhaust port connected to the pump control valve, a fluid connection extending between the fluid pressure motors and the variable pressure control valve for controlling the opening of the exhaust port for further controlling the connection and disconnection of the auxiliary pump, and means controlling the actuation of the electric motor driven pump to supply the high pressure line when the output of the system pump and the auxiliary pump fail to supply the needs to accomplish the selected blade shift.

14. The combination set forth in claim 12 wherein, the servo actuated distributor valve includes an actuating piston and chamber of relatively small area for moving the distributor valve in the pitch decreasing direction, said servo actuating distributing valve including an actuating piston and chamber of relatively large area for moving the distributor valve in the pitch increasing direction, said speed responsive valve and said selector valve providing passage means for controlling the application of low pressure to the large servo chamber and the drain of fluid therefrom during the governed speed operation of said propeller.

15. The combination set forth in claim 14 wherein, said selector valve includes passage means and control ports by-passing the control effect of the speed sensitive valve during feathering and negative pitch range of propeller operation.

16. The combination set forth in claim 12 wherein, the speed sensitive valve has a centrifugally responsive plunger and a follow-up sleeve cooperable therewith, said sleeve providing the said pressure and control port, passage means connected with said control port for application of the low pressure fluid upon initiating movement of said plunger, and a linkage between the sleeve and servo actuated distributor valve for transmitting movement of said distributor valve to said sleeve for cutting off the flow of low pressure to the servo actuated distributor valve when the blades have reached the required setting in the governed speed range.

17. A fluid pressure system for control of variable pitch propellers having blades adjustable and controllable in governed speed, feathering, and negative pitch ranges including, a source of fluid pressure, a relatively high pressure line connected to said source, fluid pressure actuated servomotor means operatively connected to said blades for effecting adjustment thereof, first valve means in circuit connection with said relatively high pressure line between said source and said servo motor means for controlling the application of fluid pressure thereto, servo mechanism operatively connected with said first valve means for effecting actuation thereof, said servo mechanism including a pair of piston and cylinder combinations of different areas operable upon the first valve means in opposing relation, means connected to said source providing a relatively low pressure line and second valve means in circuit connection with said relatively low pressure line between said source and said piston and cylinder combinations for controlling the application of fluid pressure thereto to effect actuation of said first recited valve means which in turn effects actuation of said servo motor means to control blade adjustment.

18. In a system for control of variable pitch propellers having blades adjustable and controllable in governed speed, feathering, and negative pitch ranges, the combination comprising, means carried by the rotatable propeller providing a self-energized fluid pressure system whenever the propeller is rotated, and adapted to adjust the blade pitch in governed speed, and to move the blades to feathering and negative pitch ranges, said system including a plurality of fluid pressure pumps driven by propeller rotation, blade shifting motors carried by the propeller for actuating the blades by fluid pressure from the self-energized fluid pressure system, passage means connecting the fluid pressure system with the blade shifting motors, said passage means to the blade shifting motors including a high pressure line connecting the pump outlet to the blade motors, control mechanism having ports and passages for controlling the application of high pressure to the blade shifting motors, a pressure reducing valve connected to the high pressure line providing a relatively low pressure branch for energization of the control mechanism, said control mechanism including a servo distributor valve having differential piston areas in opposed relation, said distributor valve having a high pressure port and a pair of control ports in communication with the blade shifting motors, passage means directly connecting the low pressure branch with one of the differential piston areas during governed speed and negative pitch range, and valve means in said last mentioned passage means for opening said one piston area to drain during feathering, a speed responsive valve having a pressure port open to the low pressure branch, and having a control port for controlling the flow of fluid from the low pressure branch to the other differential piston area, and valve means limiting the control by the speed responsive valve to propeller operation in the governed speed range, pressure control means including a piston and cylinder constantly exposed to the high pressure line, passage means connecting an opposed face of the piston in the pressure control means with the blade shifting motors, a pressure operated pump control valve having a chamber connected with the first mentioned piston and cylinder for selectively connecting and disconnecting the output of one of the pumps to the high pressure line, and means including said pressure control means whereby the connecting and disconnecting depends upon the requirements of pressure and flow in accomplishing the blade shift in governed speed, feathering and negative pitch ranges.

RICHARD E. MOORE.
JAMES F. MACK.

REFERENCES CITED

The following references are of record in the file of this patent:

UNITED STATES PATENTS

| Number | Name | Date |
| --- | --- | --- |
| 1,814,827 | Caughey | July 14, 1931 |
| 2,320,195 | Rindfleisch | May 25, 1943 |
| 2,333,973 | Beebe, Jr. | Nov. 9, 1943 |
| 2,353,566 | Keller | July 11, 1944 |
| 2,375,255 | Snader et al. | May 8, 1945 |
| 2,402,065 | Martin | June 11, 1946 |
| 2,507,671 | May | May 16, 1950 |

FOREIGN PATENTS

| Number | Country | Date |
| --- | --- | --- |
| 410,728 | Great Britain | Aug. 6, 1932 |
| 89,219 | Sweden | May 4, 1937 |
| 212,020 | Switzerland | Jan. 16, 1941 |
| 220,634 | Switzerland | July 16, 1942 |
| 560,522 | Great Britain | Apr. 6, 1944 |
| 565,579 | Great Britain | Nov. 14, 1944 |